(12) United States Patent
Van Hooren et al.

(10) Patent No.: US 8,220,498 B2
(45) Date of Patent: Jul. 17, 2012

(54) CHARGE AIR HOSE

(75) Inventors: Marc Van Hooren, Freigericht-Bernbach (DE); Alexandre Daumas, Linsengericht (DE); Gerhard Hummel, Birstein (DE)

(73) Assignee: Veritas AG, Gelnhausen (DE)

( * ) Notice: Subject to any disclaimer, the term of this patent is extended or adjusted under 35 U.S.C. 154(b) by 1177 days.

(21) Appl. No.: 12/071,906

(22) Filed: Feb. 27, 2008

(65) Prior Publication Data

US 2008/0202620 A1    Aug. 28, 2008

(30) Foreign Application Priority Data

Feb. 28, 2007   (DE) .................. 10 2007 009 906

(51) Int. Cl.
*F16L 11/00*   (2006.01)
(52) U.S. Cl. ........ 138/126; 138/137; 138/140; 138/141; 138/123
(58) Field of Classification Search .............. 138/123, 138/126, 124, 140, 137, 141
See application file for complete search history.

(56) References Cited

U.S. PATENT DOCUMENTS

| | | | | | |
|---|---|---|---|---|---|
| 3,626,988 | A | * | 12/1971 | Chu | 138/121 |
| 3,682,202 | A | * | 8/1972 | Buhrmann et al. | 138/126 |
| 3,866,631 | A | * | 2/1975 | Chudgar | 138/125 |
| 3,911,962 | A | | 10/1975 | Chomat et al. | |
| 3,953,270 | A | * | 4/1976 | Ford | 156/80 |
| 3,988,189 | A | * | 10/1976 | Sullivan | 156/143 |
| 4,238,260 | A | * | 12/1980 | Washkewicz | 156/149 |
| 4,397,337 | A | * | 8/1983 | Porrmann et al. | 138/118.1 |
| 5,901,754 | A | * | 5/1999 | Elsasser et al. | 138/118 |
| 6,941,975 | B2 | * | 9/2005 | Wilson et al. | 138/141 |
| 7,044,168 | B2 | * | 5/2006 | Wilson et al. | 138/126 |
| 7,490,632 | B2 | * | 2/2009 | Grebe | 138/121 |
| 2007/0039659 | A1 | | 2/2007 | Coel et al. | |
| 2007/0186989 | A1 | | 8/2007 | Seyler et al. | |

FOREIGN PATENT DOCUMENTS

| | | |
|---|---|---|
| DE | 2 325 342 | 11/1973 |
| DE | 73 20 996 | 10/1976 |
| DE | 43 15 175 | 11/1994 |
| DE | 195 24 394 | 1/1997 |
| DE | 197 54 448 | 6/1999 |
| DE | 20 2004 014 284 | 11/2004 |
| DE | 20 2004 019 440 | 5/2006 |
| DE | 10 2004 053 985 | 6/2006 |
| DE | 10 2005 016 154 | 10/2006 |
| EP | 0 380 841 | 8/1990 |
| EP | 1 114 959 | 7/2001 |
| EP | 1 746 325 | 1/2007 |
| GB | 2 278 176 | 11/1994 |
| WO | WO 95/13495 | 5/1995 |

* cited by examiner

*Primary Examiner* — Patrick F Brinson
(74) *Attorney, Agent, or Firm* — Buchanan Ingersoll & Rooney PC

(57) ABSTRACT

The invention refers to a charge air hose for motor vehicles, comprising: a hose-shaped base member and a textile reinforcement. In a conventional charge air hose the textile reinforcement is embedded into the base member or it is arranged between two layers of the base member. A continuing dynamic load of the conventional charge air hose leads to delamination of the composite. To solve the problems known from the prior art, the invention provides a charge air hose for motor vehicles, comprising: a hose-shaped base member, a textile reinforcement arranged on the surface of the base member, wherein the hose-shaped base member is a vulcanized, elastomer-containing hose.

23 Claims, 3 Drawing Sheets

CHARGE AIR HOSE

The present invention refers to a charge air hose for motor vehicles, comprising: a hose-shaped base member and a textile reinforcement.

Charge air hoses with textile reinforcements are known from the prior art, wherein the textile reinforcement is embedded into an elastomer matrix or between two elastomer layers.

The conventional textile-reinforced charge air hoses are exposed to great mechanical work when being dynamically stressed. Both components, the reinforcement and the matrix embedding the reinforcement have different stress-strain characteristics. If the reinforcement is positioned between two layers, shear forces at the joint of matrix/reinforcement are produced when the hose is loaded, which lead to delamination of the composite and which can thus lead to failure. Additionally, microcracks in the adjoining elastomer matrix may occur as a result of the dynamic-mechanical load (strain caused by the expansion of the hose and superimposed coercive movements) due to the notch effect of the reinforcement (high e-module compared to the elastomer). These microcracks must be regarded as an origin for a crack growth.

The invention is based on the object of solving the problems known from the prior art, and particularly to provide a charge air hose which has a significantly prolonged life compared to the conventional hose when being dynamically loaded.

The invention provides a charge air hose for motor vehicles comprising: a hose-shaped base member, a textile reinforcement arranged on the surface of the base member, wherein the hose-like base member is a vulcanized, elastomer-containing hose. Since the reinforcement is arranged on the hose surface, the charge air hose according to the invention comprises one single joint between the base member and the reinforcement. The reinforcement is applied onto an elastomer in non-vulcanized state during a conventional manufacturing process and is covered by at least one elastomer layer. Due to the non-vulcanized state the elastomer is soft. Caused by the soft state of the elastomer and caused by the yarn tension during manufacture of the textile reinforcement and other procedural circumstances, the reinforcement penetrates the elastomer surface. The contact surface between the elastomer and the reinforcement is therefore three-dimensional. The elastomer enclosed the yarns of the reinforcement. With such a contact surface and at a dynamical load of the hose, the power transmission between the elastomer and the textile reinforcement is both non-positive (axially with respect to the yarn) as well as positive (radially with respect to the yarn). The positive connection has a very low bearing strength and is a weak point also when the hose is loaded to a small extent only, wherein the reinforcement disengages from the elastomer. The so-called delamination is the more distinct as the yarns are not fully embedded in the elastomer but are merely coated. In the charge air hose according to the invention the textile reinforcement is applied onto a pre-vulcanized, elastomer-containing hose. The elastomer-containing hose was preferably vulcanized before applying the textile reinforcement. This reduces friction of the textile reinforcement with respect to the elastomer hose in the case of dynamic load. The elastomer-containing hose is hard in the vulcanized state and the reinforcement can therefore not penetrate into the elastomer-containing material. The contact surface between the reinforcement and the elastomer-containing material is the two-dimensional surface of the elastomer-containing hose. The power transmission from the hose surface to the reinforcement is predominantly positive (at right angles to the hose surface) and in the ideal case it is therefore frictionless. The charge air hose according to the invention is, compared to the conventional charge air hose, very suitable against dynamic fatigue.

In a further preferred embodiment of the invention, at least one pressure ring is arranged above the textile reinforcement. This has the advantage that the pressure ring holds the reinforcement tight to the contour of the base member.

In a further preferred embodiment of the invention, the hose-shaped base member is formed as an elastomer hose.

In a further preferred embodiment of the invention, the elastomer-containing hose has a substantially smooth surface. This measure reduces friction between the reinforcement and the base member, which increases life of the charge air hose according to the invention when being loaded dynamically.

In a further preferred embodiment of the invention, the elastomer-containing hose is manufactured by an extrusion or injection molding process. These manufacturing methods prove to be especially economical in connection with elastomer-containing hoses.

In a further preferred embodiment of the invention, the elastomer-containing hose has a thermoplastic elastomer. By the addition of a thermoplastic elastomer the dynamical and mechanical properties of the hose can specifically be adjusted.

In a further preferred embodiment of the invention the textile reinforcement is formed as a knitted fabric or as a braid. The reinforcement can be designed such that it rests properly on the elastomer-containing hose and that its deformation does not exceed the range of its structural expansion. The reinforcement is therefore in a lower tension state than is the case with the conventional charge air hose, which above that is regular across the entire hose surface. Structural and material expansion are the two classical elastic expansion states of a textile structure. A textile structure is deformed by very low forces in the area of the structural expansion. The reason for this is that the yarns can slide against one another in a predetermined manner depending on the textile structure (knitted fabric, braid) and the textile structure can therefore adopt other shapes without the yarns being loaded mechanically. If the structure is further expanded, the portion of the material expansion starts. In the last mentioned expansion state the yarn structure is loaded. Small deformations of the component are connected with high forces. This embodiment in which the application of the textile reinforcement onto the vulcanized, shaped, elastomer-containing hose is implemented in the form of knitted fabrics or braids involves the greatest freedom in the construction of a textile-reinforced, elastomer-containing hose. Any existing or conceivable textile structure can be used or applied in a defined tension state. This not only enables the use of charge air hoses for significantly higher pressure ranges than the hoses formerly used in the automotive range, but also enables a controlled volume increase of the hose during operation, which is a significant progress in view of the constantly decreasing space available in the engine compartment. Such a design in which the textile reinforcement is applied in a free floating manner on the already vulcanized elastomer-containing hose and on which it has a regular tension state, also leads to a significant advantage. The textile structure is enormously flexible. This particularly applies to the braided version, since there the dynamic or mechanical power behavior can be adjusted through the braid angle or extract. The fineness or strength of the yarn is freely selectable according to the respective requirement profile, since compared to an internal reinforcement as in a conventional charge air hose there is no interaction (notch effect) between the reinforcement and the matrix.

In conventional charge air hoses, the adhesion between the layers additionally plays an essential role. In so far the strength of the yarn is limited. The stronger the yarn the worse the layer bond in the original state. The reinforcement can be applied by a form-fitting weaving-around operation, which is particularly suitable for smooth hoses. The application of a pre-fabricated braid or knitted fabric (e.g. a pre-fabricated braid hose) proves to be an option and is particularly suitable for corrugated hoses.

In a further preferred embodiment of the invention, the textile reinforcement is made of glass filament. Glass filaments belong to the high-strength yarn materials, they are inexpensive and are characterized by high thermal and chemical resistance and by a very low expansibility.

In a further preferred embodiment of the invention the textile reinforcement is formed as a 3D-braid. This manufacturing method of the textile reinforcement enables an especially high adaptation to the shape of the base member and thus an especially low relative movement of the textile reinforcement towards the base member when the charge air hose according to the invention is dynamically loaded.

In a further preferred embodiment of the invention, the textile reinforcement surrounds the molded hose properly. When the charge air tube according to the invention is dynamically loaded, a low relative movement between the base member and the reinforcement takes place.

In an especially preferred embodiment of the invention the textile reinforcement is impregnated and/or coated by a coating material. This protects the reinforcement against wear, e.g. caused by friction. Furthermore, the yarn or the textile reinforcement are provided in a cut-proof manner and are thereby protected against fraying of the individual filaments. Furthermore, the impregnation or coating of the reinforcement serves for fixing on the hose surface or for assembly adhesion. Furthermore, the yarn filaments are protected in view of the connection (e.g. to a charge air tube by means of hose clamps, couplings etc). In this embodiment, the later impregnation is possible with contour-close surfaces as well as the direct coating of the textile reinforcement after the braiding process in pre-fabricated braided hoses.

In a further preferred embodiment of the invention, the yarn of the textile reinforcement is provided with an impregnation. The impregnation is applied preferably prior to manufacture of the textile reinforcement, i.e. before braiding or knitting. This measure also serves for protecting the yarn and the textile reinforcement against wear. This protection is especially important at the yarn intersecting points of the textile reinforcement which are a weak point with respect to yarn/yarn friction.

In a further preferred embodiment of the invention, the coating material is a resin or an elastomer, preferably a silicone elastomer. The flexible resin or elastomeric coating e.g. in the form of solutions or lattices is a suitable material. When using a textile reinforcement of glass filaments an adhesion-modified silicon elastomer is used as coating material, by means of which a universal temperature resistance, high flexibility and favorable adhesion to the glass fiber filaments can be achieved.

In a preferred embodiment of the invention, the coating material is applied by submersion, varnishing or coating of the charge air hose, or by extrusion when braided hoses with later crosslinking are used, since the elastomeric coating material must fundamentally be vulcanized after application, preferably by an online method.

In a further preferred embodiment of the invention, the coating material is dyed in a color different compared to the base member and/or the reinforcement. This enables an identification of the charge air hose by the coating.

In a further preferred embodiment of the invention, the textile reinforcement is embedded on at least one hose end into a material adhesively joined with the base member. The charge air hose is preferably coated at the hose end. This prevents a detachment or fraying of the textile reinforcement and serves for functionalizing the hose ends in view of the connection and integration of functions, e.g. in the clamp seat, clamp fixing, installation marking, etc.

In a further preferred embodiment of the invention, a cap, preferably an elastomeric cap is adhered and/or vulcanized onto at least one hose end. Functionalized elastomeric hose sections are suitable for being adhered or vulcanized onto the hose ends.

A further preferred embodiment of the invention refers to a method of manufacturing a charge air hose for motor vehicles, comprising the following steps: providing an elastomer-containing hose as a hose-shaped base member, vulcanizing the elastomer-containing hose and applying a textile reinforcement onto the surface of the vulcanized, elastomer-containing hose.

A further preferred embodiment of the method according to the invention comprises the impregnation and/or coating of the textile reinforcement by a coating material to reduce the wear of the textile reinforcement.

A further preferred embodiment of the method according to the invention comprises the impregnation of the yarn of the textile reinforcement with the aim of reducing wear of the textile reinforcement by reducing the yarn/yarn friction at the intersecting points of the textile reinforcement.

A further preferred embodiment of the method according to the invention comprises the covering of the elastomer-containing hose by knitting, weaving or braiding for applying the textile reinforcement.

Preferred embodiments and features of the invention will now be described with reference to the enclosed drawings.

SHORT DESCRIPTION OF THE DRAWINGS

Figure 6:
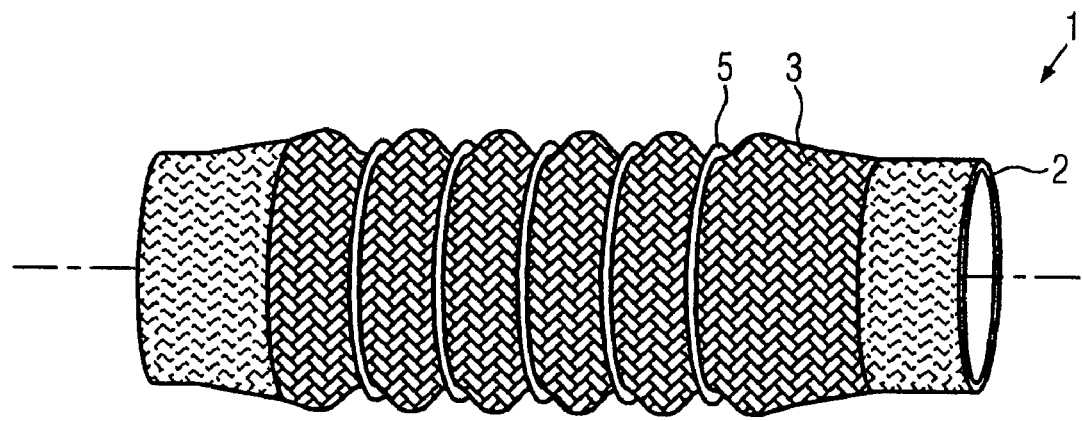

FIG. 6 shows a perspective view of the charge air hose according to the invention according to a third embodiment, comprising an elastomer-containing hose as base member, a textile reinforcement at the hose surface, wherein the elastomer-containing hose is formed as a corrugated hose, and wherein one pressure ring among a plurality of pressure rings is arranged in a wave trough between two adjoining wave crests of the corrugated hose above the textile reinforcement.

Figure 7:
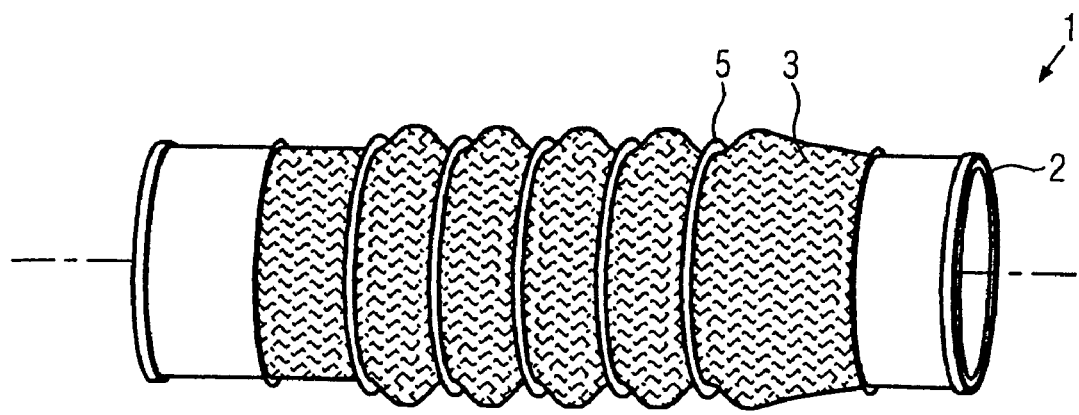

FIG. 7 shows a perspective view of the charge air hose according to the invention according to a fourth embodiment, comprising an elastomer-containing hose as a base member, a textile reinforcement at the hose surface, wherein the elastomer-containing hose is formed as a corrugated hose, and wherein one pressure ring among a plurality of pressure rings is arranged in a wave trough between two adjoining wave crests of the corrugated hose above the textile reinforcement, wherein an impregnation or coating is applied section-wise on the textile reinforcement.

DETAILED DESCRIPTION OF THE PREFERRED EMBODIMENTS

The invention refers to a charge air hose 1 for motor vehicles, comprising: a hose-shaped base member 2, a textile pressure member 3 arranged on the surface of the base member 2, wherein the hose-shaped base member 2 is a vulcanized, elastomer-containing hose. The elastomer-containing hose 2 of the charge air hose 1 according to the invention is formed as an elastomeric hose and was vulcanized already before applying the textile reinforcement 3. The elastomer-containing hose 2 also has a substantially smooth surface. Depending on the respective embodiment, the elastomer-containing hose 2 is manufactured by extrusion or injection molding. In a preferred embodiment of the invention, the elastomer-containing hose 2 is formed as a molded hose, preferably as a corrugated hose. To manufacture the elastomer-containing hose 2, all elastomeric materials, particularly also thermoplastic elastomers can be used.

A knitted fabric or braid is designated as textile reinforcement 3, which according to the invention is arranged at or on the surface of the hose-shaped base member 2 to restrict a volume increase of the hose 2. The textile reinforcement 2 is preferably made of glass filaments. In the preferred embodiments of the invention, in which the elastomer-containing hose is formed as a molded hose or corrugated hose, the textile reinforcement 3 properly encloses the molded hose 2. The textile reinforcement 3 is formed as a braid, which is for instance manufactured by round braiding, 3D-braiding and/or braiding-around of an end contour-close core. Pressure rings 5, preferably made of plastics or metal are preferably arranged in the wave troughs of the corrugated hose 2 to hold the textile reinforcement 3 in the wave troughs possibly tightly at the hose surface.

The textile reinforcement 3 is preferably impregnated and/or coated by a coating material 4. The coating material 4 is preferably a resin or an elastomer, preferably a silicone elastomer. As an alternative or additionally, the yarn of the textile reinforcement 3 can be impregnated by the coating material 4. The coating material 4 is preferably applied by submersion, varnishing, or coating of the charge air tube 1 or the pre-fabricated textile reinforcement itself, i.e. before application onto the surface of the vulcanized, elastomer-containing hose 2. The yarn impregnation is carried out before manufacturing the textile reinforcement 3. The coating material 4 may have the color of the base member 2 and/or the reinforcement 3 or it can be dyed in a color different to the base member 2 and/or the reinforcement 3 to dye and/or mark the charge air hose 1 through the coating material 4.

To functionalize the hose ends in view of the connection and integration of functions, e.g. clamp seat, clamp fixing, installation marks, the hose ends can be coated or pre-fabricated caps, preferably elastomeric caps, or functionalized, elastomeric hose sections can be adhered and/or vulcanized on.

The above-mentioned features of the invention can arbitrarily be combined with one another.

A first embodiment of the invention will now be described with reference to FIGS. 1 and 2.

Figure 1:
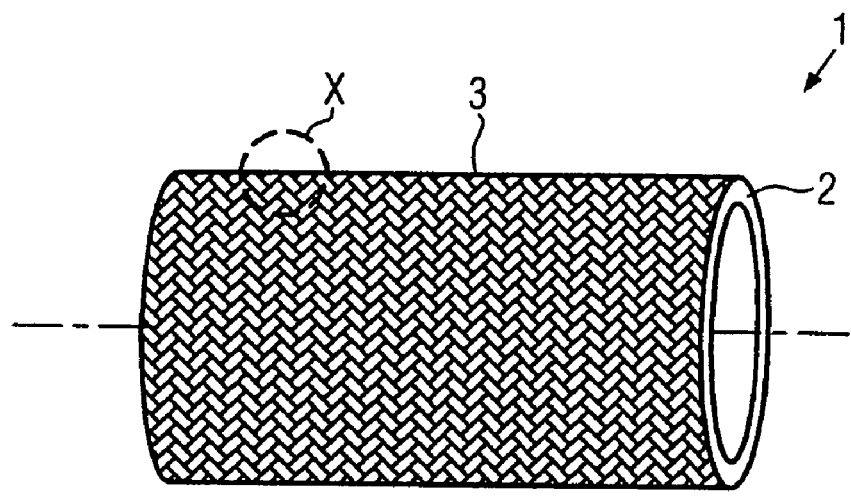
FIG. 1 shows a perspective view of the charge air hose according to the invention according to a first embodiment, with an elastomer-containing hose as a base member and a textile reinforcement at the hose surface.

FIG. 1 shows a perspective view of the charge air hose 1 according to the invention according to a first embodiment of the invention. The charge air hose 1 according to the invention of the first embodiment comprises a vulcanized elastomeric hose 2 as base member and a textile reinforcement 3 arranged at or on the hose surface. The textile reinforcement 3 is shown symbolically in FIG. 1 and is preferably formed as a knitted fabric or braid of glass filaments.

Figure 2:
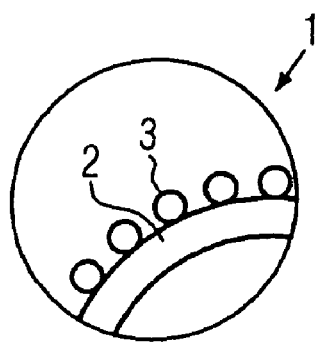
FIG. 2 shows a cross-sectional section of the charge air hose according to the invention of FIG. 1.

FIG. 2 shows a cross-sectional section of the charge air hose 1 of the first embodiment of FIG. 1. As can be seen in FIG. 2, the yarns of the textile reinforcement 3 are arranged at or on the surface of the elastomeric hose 2 without penetrating the material of the elastomeric hose or without being embedded into the elastomeric hose 2.

Figure 3:
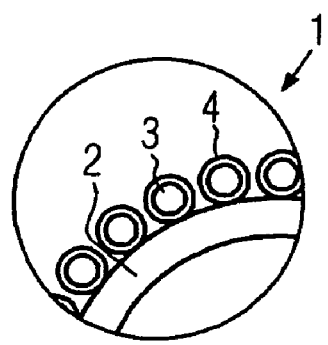
FIG. 3 shows a cross-sectional section of the charge air hose according to the invention of FIG. 1, wherein the yarn of the textile reinforcement is impregnated or coated.

FIG. 3 shows a cross-sectional section of a variant of the first embodiment in a similar view as FIG. 2, wherein the yarns of the textile reinforcement 3 are provided with an impregnation 4.

Figure 4:
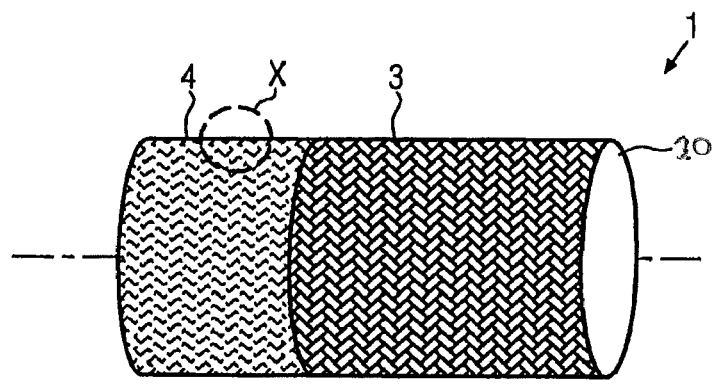
FIG. 4 shows a perspective view of the charge air hose according to the invention according to a second embodiment, with an elastomer-containing hose as base member, a textile reinforcement at the hose surface and an impregnation or coating applied onto the textile reinforcement.

FIG. 4 shows a charge air hose 1 according to the invention according to a second embodiment of the invention in a perspective view. The charge air hose 1 of the second embodiment comprises a vulcanized elastomeric hose 2 as base member and a textile reinforcement 3 arranged at or on the hose surface. The textile reinforcement 3 is shown symbolically only and is preferably formed as a knitted fabric of braid of glass filaments. The textile reinforcement 3 is impregnated and/or coated by a coating material 4. The coating material 4 can be applied section-wise or completely over the hose length and the hose periphery. A cap 10 can be adhered and/or vulcanized onto at least one end of the charge air hose 1.

Figure 5:
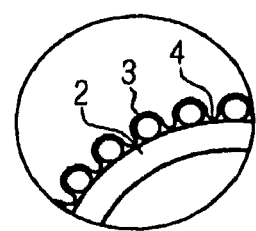
FIG. 5 shows a cross-sectional section of the charge air hose according to the invention of the second embodiment of FIG. 4.

FIG. 5 shows a cross-sectional section of the charge air hose 1 according to the invention of the second embodiment of FIG. 4.

FIG. 6 shows the charge air hose 1 according to the invention according to a third embodiment of the invention. The charge air hose 1 according to the invention of the third embodiment comprises a vulcanized elastomeric hose 2 as base member formed as a corrugated hose and a textile reinforcement 3 arranged on the hose surface. The textile reinforcement 3 is shown symbolically only and is preferably formed as a knitted fabric or braid of glass filaments. As shown in FIG. 6, the textile reinforcement 3 follows the contour of the molded hose or corrugated hose 2. In some wave troughs a pressure ring 5 is arranged above the textile reinforcement 3 between two adjoining wave crests each. Each pressure ring 5 is slipped onto the charge air tube 1 and by crushing together the elastomeric hose it is brought 2 to its determined position in a wave trough between two wave crests of the corrugated hose 2. Each pressure ring 5 has the function of keeping the textile reinforcement 3 possibly tight to the contour of the corrugated hose 2 and of preventing a tension of the textile reinforcement 3 to bridge the wave trough when the charge air hose 1 is dynamically loaded. This reduces friction of the textile reinforcement 3 at the hose surface 2. Additionally, the textile reinforcement 3 is embedded at the hose ends into a material adhesively joined to the base member 2, wherein this material is preferably an elastomer-containing material injected round the hose ends.

FIG. 7 shows the charge air hose 1 according to the invention according to a fourth embodiment of the invention. The charge air hose 1 according to the invention of the fourth embodiment comprises a vulcanized elastomeric hose 2 as base member formed as a corrugated hose, and a textile reinforcement 3 arranged at or on the hose surface. The textile reinforcement 3 is shown symbolically only and is preferably formed as a knitted fabric or as a braid of glass filaments. The charge air hose 1 according to the invention of the fourth embodiment corresponds substantially to the charge air hose 1 according to the invention of the third embodiment, wherein additionally the flexible reinforcement 3 is impregnated and/or coated by the coating material 4. Additionally, protective caps are arranged on the hose ends to enable a detachment of the textile reinforcement 3 from the base member 2 as well and to enable a coupling of the charge air hose 1. As an alternative or additionally, the yarn of the textile reinforcement 3 itself is provided with an impregnation. This reduces the yarn/yarn friction at the intersecting points of the textile reinforcement 3.

The features of the embodiments mentioned and described can be combined in any manner.

The method of manufacturing the charge air hose 1 for motor vehicles according to the invention comprises the following steps: providing an elastomer-containing hose 2 as a hose-shaped base member, vulcanizing the elastomer-containing hose 2 and applying the textile reinforcement 3 onto the surface of the vulcanized, elastomer-containing hose 2.

To provide the charge air hose 1 according to the invention with additional advantageous features, the textile reinforcement 3 can be impregnated and/or coated by the coating material 4 before or after application of the textile reinforcement 3 onto the surface of the vulcanized, elastomer-containing hose 2. As an alternative or additionally, the yarn of the textile reinforcement 3 can be provided with an impregnation 4 before manufacture of the textile reinforcement 3. Moreover, the textile reinforcement 3 can be pre-fabricated before application into the surface of the vulcanized, elastomer-containing hose 2 or it can be manufactured in a routine method on the surface of the vulcanized, elastomer-containing hose 2. The conventional braiding technology is for instance suitable for this purpose.

The invention claimed is:

1. Charge air hose for motor vehicles, comprising:
a hose-shaped base member, and
a textile reinforcement arranged to directly contact the surface of the base member,
wherein the hose-shaped base member is a vulcanized, elastomer-containing hose, and the textile reinforcement is formed as a knitted fabric or braid, wherein a yarn of the textile reinforcement is provided with an impregnation.

2. Charge air hose as claimed in claim 1, wherein at least one pressure ring is arranged above the textile reinforcement.

3. Charge air hose as claimed in claim 1, wherein the elastomer-containing hose is formed as an elastomeric hose.

4. Charge air hose as claimed in claim 1, wherein the elastomer-containing hose has a substantially smooth surface.

5. Charge air hose as claimed in claim 1, wherein the elastomer-containing hose is manufactured by extrusion or injection molding.

6. Charge air hose as claimed in claim 1, wherein the elastomer-containing hose is formed as a molded hose.

7. Charge air hose as claimed in claim 1, wherein the elastomer-containing hose is a thermoplastic elastomer.

8. Charge air hose as claimed in claim 1, wherein the textile reinforcement is made of glass filaments.

9. Charge air hose as claimed in claim 6, wherein the textile reinforcement properly encloses the molded hose.

10. Charge air hose as claimed in claim 1, wherein the textile reinforcement is formed as a braid which is manufactured by round braiding, by 3D-braiding and/or by braiding around an end contour-close core.

11. Charge air hose as claimed in claim 1, wherein the textile reinforcement is impregnated and/or coated by a coating material.

12. Charge air hose as claimed in claim 11, wherein the coating material is a resin or elastomer.

13. Charge air hose as claimed in claim 11, wherein the coating material is applied by submersion, varnishing or coating the charge air hose.

14. Charge air hose as claimed in claim 11, wherein the coating material is dyed in a color different to the color of the base member and/or the reinforcement.

15. Charge air hose as claimed in claim 1, wherein the textile reinforcement is embedded on at least one end of the charge air hose into a material adhesively joined with the base member.

16. Charge air hose as claimed in claim 1, wherein at least one end of the charge air hose is coated.

17. Charge air hose as claimed in claim 1, wherein a cap is adhered and/or vulcanized onto at least one end of the charge air hose.

18. Method of manufacturing a charge air hose for motor vehicles, comprising the following steps:
providing an elastomer-containing hose as a hose-shaped base member,
vulcanizing the elastomer-containing hose, and
applying a textile reinforcement directly onto the surface of the vulcanized, elastomer-containing hose.

19. Method as claimed in claim 18, comprising impregnation and/or coating of the textile reinforcement by a coating material.

20. Method as claimed in claim 18, comprising providing a yarn of the textile reinforcement with an impregnation before the textile reinforcement is manufactured.

21. Method as claimed in claim 18, wherein the textile reinforcement is applied by knitting or braiding around the elastomer-containing hose.

22. Charge air hose as claimed in claim 1, wherein the elastomer-containing hose is formed as a corrugated hose.

23. Charge air hose as claimed in claim 11, wherein the coating material is a silicone elastomer.

* * * * *